United States Patent [19]

Vanderspurt

[11] 4,127,508

[45] Nov. 28, 1978

[54] SILVER-CADMIUM ALLOY CATALYST

[75] Inventor: Thomas H. Vanderspurt, Gillette, N.J.

[73] Assignee: Celanese Corporation, New York, N.Y.

[21] Appl. No.: 846,064

[22] Filed: Oct. 27, 1977

Related U.S. Application Data

[63] Continuation-in-part of Ser. No. 714,201, Aug. 13, 1976, abandoned.

[51] Int. Cl.$^2$ .................. B01J 21/04; B01J 21/08; B01J 23/06; B01J 23/50
[52] U.S. Cl. .................................. 252/457; 252/463; 252/475; 568/881

[58] Field of Search ............... 252/457, 463, 475; 260/638 B

[56] References Cited

U.S. PATENT DOCUMENTS

2,763,696   9/1965   Finch et al. .................. 260/638 B

Primary Examiner—W. J. Shine
Attorney, Agent, or Firm—Kenneth A. Genoni

[57] ABSTRACT

This invention provides a silver-cadmium alloy catalyst which is highly selective for hydrogenation of $\alpha,\beta$-unsaturated carbonyl compounds to the corresponding $\alpha,\beta$-unsaturated alcohol derivatives. Acrolein is hydrogenated to allyl alcohol in 70 percent yield at 100 percent conversion.

9 Claims, No Drawings

SILVER-CADMIUM ALLOY CATALYST

This patent application is a continuation-in-part of patent application Ser. No. 714,201, filed Aug. 13, 1976, now abandoned.

BACKGROUND OF THE INVENTION

Several methods are known in the prior art for converting $\alpha,\beta$-olefinically unsaturated carbonylic compounds into the corresponding $\alpha,\beta$-olefinically unsaturated alcohols, and various selective catalysts are provided for improved conversion and yields.

British Pat. No. 734,247 and U.S. Pat. No. 2,763,696 disclose a process whereby acrolein may be converted to allyl alcohol by means of a vapor phase hydrogenation process. According to this process, moderate yields of allyl alcohol are obtained when acrolein is treated with free hydrogen in the vapor phase at a temperature between 210° C. and 280° C. in the presence of a catalyst comprising cadmium and one or more heavy metals of groups I, II, VI and VIII of the periodic table. The preferred catalysts are admixtures of cadmium with copper and cadmium with silver.

German Pat. No. 858,247 discloses a somewhat different process which is also useful for the conversion of acrolein to allyl alcohol. According to the German patent, good yields of allyl alcohol are obtained by reacting acrolein with free hydrogen in the presence of a catalyst containing cadmium oxide and a metal hydrogenating component which is preferably copper. The patent teaches that the best results are obtained when the process is operated at high temperatures and at high pressures on the order of 100–300 atmospheres.

It is also known to convert $\alpha,\beta$-unsaturated aldehydes into the corresponding unsaturated alcohols in the liquid phase by means of hydrogenation in the presence of a mixture of a copper soap and cadmium soap. It is assumed that the copper salt is the catalyst and that the cadmium salt only serves the function of preventing the copper salt from being reduced to metallic copper. The use of a solution of a mixture of a copper salt and a cadmium salt for catalyst has the disadvantage that the system is extremely unstable under the required processing conditions, and fluctuations in conditions can cause reduction of the $Cd^{2+}$ salt and/or the $Cu^{2+}$ salt to metals.

U.S. Pat. No. 3,686,333 describes a liquid phase hydrogenation process for converting alkenals into alkenols in the presence of a catalyst mixture of a cadmium salt of a fatty acid and a transition metal salt of a fatty acid.

Japanese Pat. No. 73-01,361 discloses a process for hydrogenating $\alpha,\beta$-olefinically unsaturated aldehydes into the corresponding allylic alcohol derivatives. The efficiency of the process is improved by the recycle of by-products to the hydrogenation zone, or by passage of the by-products stream into a second hydrogenation zone. The preferred catalysts are mixtures of cadmium and copper, cadmium and silver, cadmium and zinc, cadmium and chromium, copper and chromium, and the like. The Japanese patent discloses that under steady state conditions 1.5 moles/hour of acrolein are converted to 1.05 moles/hour of allyl alcohol and 0.4 mole/hour of n-propanol.

There remains a need for a commercially feasible vapor phase process for converting $\alpha,\beta$-olefinically unsaturated carbonylic compounds into allylic derivatives in higher efficiency and yield then has been achieved heretofore in the prior art, and a need for an improved catalyst to facilitate the achievement of the commercially feasible hydrogenation process.

Accordingly, it is an object of the present invention to provide a novel silver-cadmium alloy catalyst for selective hydrogenation of $\alpha,\beta$-olefinically unsaturated carbonylic compounds to the corresponding allylic derivatives.

It is another object of the present invention to provide an improved process for producing allylic alcohol derivatives by hydrogenation of $\alpha,\beta$-olefinically unsaturated carbonylic compounds.

It is a further object of the present invention to provide a process for converting acrolein into allyl alcohol with a conversion of at least 95 percent and a yield of at least 70 percent.

Other objects and advantages of the present invention shall become apparent from the following description and examples.

DESCRIPTION OF THE INVENTION

One or more objects of the present invention are accomplished by the provision of a novel catalyst composition which consists essentially of a silver-cadmium alloy on a carrier substrate, wherein the atomic ratio of silver to cadmium in the alloy is in the range of between about 0.1 and 4 to 1.

The carrier substrate can be selected from silica, Celite, diatomaceous earth, kieselguhr, alumina, silica-alumina, titanium oxide, pumice, carborundum, boria, and the like. It is highly preferred that the silver-cadmium alloy be supported on a silica and/or alumina carrier substrate. The quantity of carrier substrate in the catalyst composition can vary in the range of between about 5 and 99.5 weight percent, based on the total catalyst weight.

The preferred catalysts are prepared by coprecipitating hydroxides of silver and cadmium from an aqueous solution of calculated quantities of water-soluble salts of silver and cadmium. The precipitation is effected by the addition of caustic to the aqueous solution.

The carrier substrate component of the catalyst composition can be incorporated during the catalyst preparation by slurrying the finely divided carrier substrate mass in the said aqueous medium immediately after the silver-cadmium hydroxides are precipitated. Finely divided porous materials such as fumed silica or diatomaceous earth are highly preferred carrier substrate materials for the preparation of the present invention catalysts.

After the coprecipitation of silver-cadmium hydroxides has been accomplished, the solids phase is recovered by filtration or other conventional means. The filtered solids are washed with chloride-free water until essentially neutral. For the purposes of a fixed bed operation, the dried filter cake preparation is calcined at a temperature between about 100° C. and 300° C. for a period of about two to twenty hours or longer, and then the calcined material is ground and pelleted. Prior to use the catalyst pellets can be reduced in a stream of hydrogen at a temperature between about 50° C. and 250° C. for a period of about 5 hours. For a fluidized bed operation, the calcined catalyst preparation can be ground and sized in a conventional manner to satisfy process design requirements. The reduction of the catalyst can also be accomplished in situ during a vapor phase hydrogenation process.

There are several critical aspects of catalyst preparation which must be respected in order to achieve a novel type of hydrogenation catalyst having unique and advantageous properties in comparison to prior art catalysts for selective hydrogenation of acrolein type compounds to allyl alcohol type compounds.

Firstly, the silver-cadmium alloy in the catalyst must contain an atomic ratio of silver to cadmium in the range between about 0.1 and 4 to 1, and preferably between about 0.4 and 3.0 to 1.

Secondly, the silver and cadmium in the catalyst must be in the free metal state, and must be substantially in the form of an alloy, i.e., X-ray diffraction spectra should confirm the absence of unalloyed silver or cadmium crystals. Preferred silver-cadmium alloy catalysts are solid solutions which nominally exhibit an X-ray diffraction pattern which is substantially free of detectable unalloyed metal crystallite lines.

In terms of X-ray diffraction data as more fully described hereinbelow, a preferred silver-cadmium alloy catalyst can consist substantially of α-phase silver-cadmium, without detectable splitting of X-ray diffraction lines which is indicative of silver-rich and/or cadmium-rich α-phase crystallites. Silver-cadmium catalysts which also have outstanding selectivity for high yield conversion of acroleintype compounds into allyl alcohol-type compounds are those in which the alloy composition consists of more than about 50 percent of γ-phase silver-cadmium crystallites as characterized by X-ray diffraction pattern. Another preferred silver-cadmium alloy catalyst can have α,γ and ε-phase crystallites present. Those especially rich in ε-phase, while very highly selective, are somewhat less active than those richer in nonsplit α-phase alloy.

Thirdly, it has been found that the production of silvercadmium alloy catalysts, which exhibit the greatest selectivity for converting acrolein to allyl alcohol, can be achieved if the coprecipitation step of the catalyst preparation is conducted within restricted limitations and under controlled conditions. Thus, the total concentration of the water-soluble salts (e.g., nitrate salts) in the aqueous solution should be maintained in the range between about 5 weight percent and the solubility limit of the salts, and the quantity of caustic added as a precipitating agent should approximate the stoichiometric amount within narrow limits. It is particularly advantageous to employ a water-soluble hydroxide (e.g., an alkali metal hydroxide) as the caustic precipitating agent, and to add the caustic rapidly with vigorous stirring to facilitate formation of a precipitate of fine crystals or gel. Excellent results are obtained, for example, if 17 grams of silver nitrate and 34 grams of cadmium nitrate are dissolved in 200 milliliters of water, and 18 grams of potassium hydroxide are dissolved in 200 milliliters of water, and both solutions are added rapidly and simultaneously to 100 milliliters of water with vigorous stirring.

Other precautions must be observed during catalyst preparation if highly selective silver-cadmium alloy compositions are to be achieved. It has been found that the calcination step of the catalyst preparation most advantageously must be conducted within narrowly controlled limitations. The calcination step should be accomplished at a temperature between about 100° C. and 300° C., and most preferably at a temperature between 120° C. and 250° C. If calcination of a silver-cadmium alloy catalyst is conducted at a temperature above about 300° C., the resultant catalyst exhibits less selectivity for high yield conversion of acrolein to allyl alcohol in a vapor phase process.

The importance of controlled calcination conditions is apparent from a comparison of the data presented in the Examples hereinbelow with the data reported in Example VII of U.S. Pat. No. 2,763,696. In the said patent Example VII, over a silver-cadmium catalyst acrolein is hydrogenated in vapor phase to allyl alcohol in a yield of 38.3% at a conversion rate of 95%. This is in contrast to the results reported hereinbelow. In Example I, inter alia, acrolein is converted to allyl alcohol in yields above 70% at a conversion rate above 95%. The low selectivity of the U.S. Pat. No. 2,763,696 catalyst is believed to be attributable to the presence of a substantial quantity of unalloyed silver crystallites. The patent catalyst is calcined at 400° C. for 2–6 hours during the preparation procedure. High calcination temperatures can have the effect of segregating the active metal species into large crystallites of substantially unalloyed silver, and into cadmium-rich crystallites which are relatively inactive as catalytic species. The presence of unalloyed silver and/or cadmium is detrimental to the hydrogenation selectivity characteristics of silver-cadmium catalysts.

The detrimental effect of a high calcination temperature on a silver-cadmium catalyst is demonstrated in EXAMPLE XIV hereinbelow. Two identical silver-cadmium catalysts were prepared, except that one catalyst was calcined at 175° C. and the other at 400° C. X-ray diffraction analysis of the two silver-cadmium catalysts indicated that the catalyst calcined at 175° C. was substantially free of detectable unalloyed metal crystallite lines, while the catalyst calcined at 400° C. exhibited lines characteristic of discrete silver crystallites; the cadmium appeared to be present as $Cd_8Ag_5$ crystallites.

In the case of the 175° C. calcination catalyst, both in the reduced and reduced/used states, the crystallinity was low width uninterpretable broad diffuse back reflection. Before reduction only a small amount of silver was identified amidst silver oxide, cadmium oxide and cadmium hydroxide. The 400° C. calcination catalyst had substantially more silver amidst cadmium oxide. In the reduced and reduced/used states medium crystallinity with broad back reflections was evident.

The two silver-cadmium catalysts were tested for selective hydrogenation of acrolein to allyl alcohol. The results reported in TABLES XIV and XIV-A illustrate that the silver-cadmium catalyst calcined at 175° C. had superior selective hydrogenation properties in comparison to the 400° C. calcination silver-cadmium catalyst.

It has also been found that the silver-cadmium alloy catalysts of the present invention are most effective when supported on a carrier substrate, i.e., in combination with an internal diluent. Catalysts prepared without a carrier substrate have been found to have lower activity and shorter catalyst life than the corresponding supported catalysts in vapor phase hydrogenation processes. A typical carrier substrate will have an initial surface area of more than about 1–10 m²/gm, and an average pore diameter greater than about 20 Å. A high proportion of small pores is detrimental to catalyst activity, if the size of the pores are such that capillary condensation of an acrolein-type compound occurs and causes pore blockage. This results in loss of catalytic activity.

The desired supported silver-cadmium alloy catalysts can be achieved by introducing a calculated quantity of silver and cadmium complexes or salts in solution into the pores of a support such as silica or controlled pore size glass. The amount of each and the total concentration is adjusted so as to achieve the desired metal ratio and total percent by weight alloy. The solvent is then removed in a manner conducive to the intimate co-deposition of the silver and cadmium complexes or salts on the interior surfaces of the pores. In the case of aqueous silver acid cadmium nitrate solutions in silica, exposure of the support and adsorbed solution at room temperature under about 100 Torr helium to a liquid nitrogen cooled vapor trap for about 48 hours is a convenient procedure. After solvent removal, alternate degassing and reducing conditions are imposed by exposure at elevated temperatures to a vacuum alternated with a low pressure stream of a reducing gas such as hydrogen, synthesis gas, carbon monoxide or hydrazine. The catalyst is then allowed to cool under at least one atmosphere of hydrogen. X-ray diffraction is conveniently employed to verify that alloy formation is complete. Catalysts prepared in this manner are not subjected to conventional air calcination conditions. The catalysts are stored in a relatively oxygen-free environment until usage.

Other objects of the present invention are accomplished by the provision of an improved hydrogenation process for converting $\alpha,\beta$-olefinically unsaturated carbonylic compound into the corresponding allylic alcohol derivative which comprises reacting an $\alpha,\beta$-olefinically unsaturated carbonylic compound with hydrogen in the vapor phase at a temperature between about 0° C. and 300° C. and a pressure between about 15 and 15,000 psi in the presence of a catalyst comprising a silver-cadmium alloy on a carrier substrate, wherein the atomic ratio of silver to cadmium in the alloy is in the range between about 0.4 and 3.0 to 1.

The $\alpha,\beta$-olefinically unsaturated carbonylic compounds amenable to the present invention process include those which correspond to the formula:

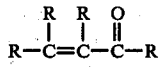

wherein R is a substituent selected from hydrogen and hydrocarbon radicals containing between one and about 10 carbon atoms. A preferred class of $\alpha,\beta$-olefinically unsaturated compounds corresponding to the above formula are those in which R is a substituent selected from hydrogen and alkyl groups containing between one and about four carbon atoms.

Illustrative of $\alpha,\beta$-olefinically unsaturated compounds which can be selectively hydrogenated in accordance with the invention process are acrolein, methacrolein, crotonaldehyde, tiglic aldehyde, $\alpha$-ethylacrolein, cinnamaldehyde, 2-hexenal, methylvinyl ketone, methylisopropenyl ketone, ethylvinyl ketone, cyclohexenylisopropenyl ketone, and the like. Heteroatoms such as halogen and nitrogen may also be present in the compounds being selectively hydrogenated to allylic derivatives.

In the practice of the invention process, the $\alpha,\beta$-olefinically unsaturated carbonylic compound and hydrogen at elevated temperature and pressure are passed in vapor phase through a reaction zone containing a novel silver-cadmium alloy catalyst having exceptional selective hydrogenation activity.

The reaction temperature of the hydrogenation process can vary in the range between about 0° C. and 300° C., and preferably between about 75° C. and 250° C., and most preferably between about 100° C. and 215° C.

The pressure of the hydrogenation process can vary in the range between about 15 and 15,000 psi, and preferably between about 75 and 5000 psi, and most preferably between about 250 and 2500 psi.

The mole ratio of hydrogen to $\alpha,\beta$-olefinically unsaturated carbonylic compound in the vapor phase feed stream can vary in the range between about 1:1 and 1000. For the selective hydrogenation of an aldehydic compound such as acrolein, the preferred mole ratio of hydrogen to carbonylic compound in the feed stream is in the range between about 5:1 and 200:1, and the most preferred mole ratio in the range between about 10:1 and 150:1.

The rate at which the vapor phase gas stream is contacted with the silver-cadmium alloy catalyst is not critical, and can be varied consonant with the other processing conditions to achieve an optimal balance of conversion and yield parameters. The flow rate of feed gas reactants can vary over a broad range between about a total of 10 moles and 1000 moles of feed gas reactants per liter of catalyst per hour. In the case of acrolein and methylvinyl ketone and other low molecular weight carbonylic compounds, a preferred flow-rate of feed gas reactants is one which provides a catalyst contact time between about 0.1 and 50 seconds. By the invention process, acrolein can be converted to allyl alcohol with a space-time yield of greater than 900 grams per liter of catalyst per hour.

The process can be conducted either by passing the feed mixture through a fixed catalyst bed, or through a reactor wherein the catalyst is present in finely divided form and is maintained in a fluidized state by the upward passage therethrough of the gaseous reactants. The process is most conveniently carried out in a continuous manner, although intermittent types of operation can be employed. In a preferred method of continuous operation, the components of the feed stream are brought together and under the desired pressure are passed in vapor phase through the catalyst heated to the desired temperature. The reaction zone advantageously is an elongated tube or tubes containing the catalyst. The feed can be brought into contact with the catalyst in either the unheated or preheated condition. The effluent from the reactor can then be separated into various constituents by conventional means, the most convenient of which is that of fractional distillation. If desired, any unconverted portion of the carbonylic reactant present in the effluent can be recirculated through the catalyst in the reactor, preferably admixed with fresh feed gases.

The following examples are further illustrative of the present invention. The reactants and other specific ingredients are presented as being typical, and various modifications can be derived in view of the foregoing disclosure within the scope of the invention.

The X-ray diffraction photographs were obtained on a Philips XRG-3000 constant potential, constant milliampere X-ray generator, using Ni filtered $CuK_\alpha$ radiation, 35 KV and 20 MA. The diffraction photographs were prepared from the catalyst samples after a slight mortar treatment using Philips DebyeScherrer Powder Cameras of 114.6 mm diameter, with 0.3 mm diameter thin walled glass capillaries for the samples and a film illuminator and measuring device for measurement of the diffraction lines. Ilford industrial X-ray film type G was used for the photographs.

The X-ray diffraction identification of Ag, CdO and AgCd is in accordance with Astrand and Westgreen Z. anorg. Allg. Chemic, 175, 90(1928). The crystal planes are 111, 200, 220, 311, etc. Phase diagrams of AgCd, AgZn, CdZn, and the like, are published in "Constitution of Binary Alloys" by Max Hansen (2nd Edition, McGraw Hill, New York, N.Y. 1958).

Ag: 2.36(100), 2.04(38), 1.445(25), 1.23(26), 1.18(13).

α-AgCd: Values are usually slightly higher than Ag to 2.41Å etc. The slight changes in spacings are quite visible visually, especially when the back reflection scattering can also be seen, i.e., 2.36 to 2.41 Å for 111.

γ-AgCd: $a_o$ from 9.935 to 9.982 Å is a complex body centered system, thus calculation yields the spacing ranges. The spacings actually are quite close to those of Ag: 2.34–2.35, 2.03–2.04, 1.43–1.44, 1.23, 1.18–1.19 Å; however there are spacings at 1.66–1.67 and 1.35–1.36 Å which are not presented in Ag.

ε-AgCd: $a_o$ from 3.040 to 3.095 Å, $c_o$ const at 4.810 Å, hexagonal system. The ε-AgCd essentially every line visible in the spectra can be covered. There is a distinction however, i.e., spacings at 2.65, 2.41, 2.31 Å allow distinction from Ag and γ-AgCd.

CdO: 2.71(100), 2.35(88), 1.66(43), 1.42(28), 1.36(13), 1.05(13), 0.96(11).

EXAMPLE I

A catalyst was prepared by the rapid dropwise co-addition of 100 milliliters of a 1.0 molar AgNO$_3$, 0.49 molar Cd(NO$_3$)$_2$ solution and 100 milliliters of a 1.72 molar KOH solution to 400 milliliters of vigorously stirred doubly distilled water. About 19 grams of Cab-O-Sil H-5 silica (325 m$^2$/g, Cabot Corp. Boston, Mass.) were then thoroughly mixed with the resultant slurry of silver-cadmium coprecipitate. The slurry was filtered, and the filter cake was washed with about 600 milliliters of doubly distilled water. The filter cake was calcined in air at 250° C. for 16 hours. The resultant material was crushed and screened to yield a 50–80 mesh fraction. Bulk chemical analysis of this material indicated that it contained 54% SiO$_2$, 17.3% Cd, 27.5% Ag with 0.3% K also present. Powder X-ray diffraction studies revealed that the composition metallic silver crystallites and cadmium oxyhydroxide Cd$_3$[O(OH)]$_2$ of two types, and cadmium hydroxide Cd(OH)$_2$. The silica, being amorphous, contributed no significant X-ray diffraction pattern.

Approximately 2.62 grams of the prepared silver-cadmium catalyst was charged to a 0.925 cm i.d. by 28 cm reactor tube. Hydrogen gas at 200 psig was passed over the catalyst in the reactor tube at 500 SCCM and the temperature was increased from 21° C. to 175° C. over the course of one hour, at which time the gas was charged to one containing 1 part acrolein and 40 parts hydrogen. The reactor effluent was sampled using a gas sampling valve and gas chromatography. Table I summarizes the process conditions employed and the product yields obtained.

Powder X-ray diffraction examination of the used catalyst disclosed lines at 2.38, 2.06, 1.46 and 1.25 Å, which indicated that a silver-cadmium alloy of the α-type was present on the silica. Chemical analysis of the alloy determined the content as 61.4% Ag and 38.5% Cd by weight. No discrete Ag or Cd crystallites were detectable.

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 2.2 | 125 | 206 | 7.25 | 2.90 | 73.80 | 26.2 | 0.0 |
| 2.3 | 175 | 198 | 6.97 | 41.42 | 76.20 | 22.0 | 1.8 |
| 0.9 | 175 | 500 | 17.60 | 97.40 | 76.80 | 11.2 | 12.0 |

EXAMPLE II

A silver-cadmium solution was prepared by dissolving 34 grams AgNO$_3$ (0.020 mole) and 30 grams Cd(NO$_3$)$_2$.4H$_2$O (0.097 mole) in doubly distilled water to a total solution volume of 200 milliliters. A sodium hydroxide solution was prepared by dissolving 11.9 grams of NaOH (0.298 mole) in sufficient doubly distilled water to adjust the volume to 200 milliliters. Both solutions were then added dropwise with rapid stirring to 400 milliliters of distilled water. The resultant brown precipitate was recovered and added to a suspension of 100 milliliters of Cab-O-Sil M-5 in 200 milliliters of distilled water with rapid stirring. The suspension was filtered, and the filter cake was washed with 2 liters of distilled water. The moist filter cake was then calcined in air at 250° C. for 20 hours. The material was cooled in a vacuum desiccator, and then crushed and screened to yield a 50–80 mesh fraction which by bulk chemical analysis was found to contain 61% Ag, 26% Cd and 12% SiO$_2$. Powder X-ray diffraction examination indicated that the silver was present as metallic crystallites and the cadmium was present as CdO.

A quantity of about 7.63 grams of this catalyst precursor was placed in a 0.925 cm i.d. by 28 cm reactor tube and 200 psig hydrogen flowing at 750 SCCM was passed over the catalyst precursor as the temperature was raised from 23° C. to 130° C. over a period of 36 minutes, at the end of which time the gas was changed to one containing approximately 1 part acrolein to 40 parts hydrogen. Table II summarizes the results obtained under a variety of process conditions with this catalyst.

X-ray diffraction analysis of the used catalyst exhibited strong sharp lines at 2.39, 2.07, 1.46, and 1.25 Å with a strong, relatively sharp, back reflection. This indicated an α-phase silver-cadmium alloy on the silica. The average composition of 70% Ag and 30% Cd by weight was determined by chemical analysis. No discrete silver or cadmium crystallites could be detected by bulk chemical analysis.

TABLE II

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 2.1 | 125 | 210 | 9.4 | 12.7 | 46.5 | 49.5 | 4.0 |
| 2.1 | 150 | 214 | 9.6 | 21.2 | 66.2 | 31.5 | 2.3 |
| 2.2 | 175 | 204 | 9.1 | 38.5 | 66.1 | 30.8 | 3.1 |
| 2.2 | 210 | 207 | 5.1 | ≈100 | 70.3 | 0.37 | 29.3 |

EXAMPLE III

For the preparation of a silver-cadmium solution, 34.7 grams AgNO₃ (0.204 mole) and 80.0 grams Cd(NO₃)₂·4H₂O (0.259 mole) were dissolved in 100 milliliters of distilled water. To this solution was added 17.0 grams of 86.7% KOH (0.263 mole) dissolved in 50 milliliters of distilled water, followed by addition of 400 milliliters of distilled water. The slurry mixture which formed was added to 400 milliliters of Cab-O-Sil M-5 suspended in one liter of distilled water with rapid stirring. The resultant solids were filtered off, partially air dried overnight, and calcined in air at 250° C. for 16 hours. After cooling in a vacuum desiccator, the material was partially crushed and extracted with distilled water for about 24 hours, then recalcined at 250° C. to 300° C. for 21 hours in air. The resultant material contained 34% by weight silver, present as metallic crystallites, 17.9% by weight cadmium as cadmium hydroxide crystallites of two types, and 33% by weight of silica, with less than 0.05% K or Cl.

This material was crushed and screened to yield a 50-80 mesh fraction, 3.16 grams of which were loaded into 0.925 cm i.d. by 28 cm reactor tube. Hydrogen gas at 200 psig was passed over the catalyst at 750 SCCM and the temperature brought rapidly from 22° C. to 127° C.; then the gas was changed to 1 part acrolein in approximately 40 parts hydrogen.

Table III summarizes the results obtained under various conditions employing this catalyst. The reactor effluent stream was analyzed by gas chromatographic techniques. Table III summarizes the reactor conditions, and the analysis of liquid products trapped at −78° C. in a collection vessel down stream from the reactor. Bulk chemical analysis of the used catalyst in conjunction with X-ray diffraction scanning indicated that an α-phase alloy with an average bulk composition of 62.9% silver and 37.1% cadmium was present. Broad X-ray diffraction lines at 2.36, 2.05, 1.45, and 1.23 Å along with broad back reflection lines were observed, which indicated the presence of α-phase silver-cadmium. No discrete silver or cadmium metallic crystallites were detected.

EXAMPLE IV

A solution was prepared by dissolving 13.07 grams AgNO₃ (0.077 mole) and 37.97 grams Cd(NO₃)₂·4H₂O (0.123 mole) in 100 milliliters of distilled water. A second solution was prepared by dissolving 20.75 grams of 87.4% analytical reagent grade KOH in (0.32 mole) 100 milliliters of distilled water. Both solutions were then rapidly and simultaneously added to a vigorously stirred 100 milliliters of distilled water, and the resulting precipitate was further suspended by the addition of 500 milliliters of distilled water. After 1 hour of stirring, 1000 milliliters of Cab-O-Sil M-5 were added, in addition to sufficient water at intervals to maintain mixture fluidity. The final volume was increased to 1800 milliliters. The pH of the supernatant phase was 6.5. Vacuum filtration was employed to produce a filter cake, which was washed with 2000 milliliters of distilled water. The filter cake was calcined in air at 250° for 25 hours. After cooling in a vacuum desiccator, the catalyst precursor was crushed and screened to yield a 50-80 mesh fraction. Bulk chemical analysis indicated that the catalyst contained 63.7% SiO₂, 7.9% Ag, 18.6% Cd, and 0.4% K by weight. Powder X-ray diffraction study revealed strong lines due to CdO, and weak lines due to Ag.

About 2.5 grams of this material were charged to a 0.55 cm i.d. by 28 cm reactor tube. Under 197 psig hydrogen flowing at 750 SCCM the temperature was raised from 24° C. to 125° C. over the course of 1.1 hours, at which time 1 part acrolein in 40 parts hydrogen replaced the pure hydrogen. Table IV lists the reactor conditions and the analysis of the liquid products collected in a trap held at −78° C. under reactor pressure.

X-ray diffraction analysis of the used catalyst indicated the presence of α-phase AgCd, γ-phase and some ε-phase AgCd alloys. No discrete metallic cadmium or silver was observed. Lines were observed at 2.41, 2.36,

TABLE III

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 2.1 | 125 | 209 | 7.8 | 38.5 | 68.0 | 31.0 | 0.0 |
| 2.0 | 150 | 223 | 8.3 | 84.7 | 69.5 | 28.0 | 2.0 |
| 2.2 | 150 | 206 | 7.7 | 78.0 | 69.0 | 28.0 | 3.0 |
| 1.6 | 170 | 290 | 5.2 | 99.9 | 66.0 | 24.0 | 10.0 |
| 0.9 | 156 | 485 | 9.7 | 97.0 | 71.0 | 19.0 | 9.0 |
| 0.9 | 160 | 515 | 10.3 | 99.9 | 70.0 | 13.0 | 17.0 |

2.08, Å, and a sharp line characteristic of γ at 1.67. The back reflection was weak. Bulk chemical analysis indicated that these alloys had an average composition of 29.8% Ag and 70.2% Cd.

TABLE IV

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 2.30 | 125 | 197 | 6.1 | 12 | 73 | 21 | 1 |
| 2.30 | 150 | 198 | 6.1 | 14 | 74 | 26 | 0 |
| 2.20 | 175 | 201 | 6.2 | 8 | 74 | 26 | 0 |
| 0.89 | 125 | 505 | 7.8 | 7 | 77 | 23 | 0 |
| 0.89 | 150 | 506 | 7.8 | 11 | 77 | 22 | 0 |
| 0.88 | 175 | 512 | 7.9 | 33 | 77 | 21 | 2 |
| 0.87 | 185 | 516 | 8.0 | 54 | 73 | 21 | 3 |

Bulk chemical analysis indicated that the average composition of the silver-cadmium alloy on silica was 58.2% Ag and 41.8% Cd.

TABLE V

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanol | Propanol |
| 0.90 | 125 | 502 | 18.7 | 61.0 | 72 | 15 | 11 |
| 0.89 | 150 | 504 | 18.8 | 82.0 | 76 | 14 | 8 |
| 0.89 | 175 | 501 | 18.7 | 99.4 | 66 | 3 | 31 |
| 0.90 | 180 | 502 | 18.7 | 99.7 | 68 | 1 | 31 |

TABLE V-A

| 3.00 | 150 | 999 | 6.7 | 11.1 | 78.9[1] | 21.1 | 0.0 |
| 3.00 | 175 | 999 | 6.7 | 91.3 | 74.2[2] | 15.5 | 10.3 |

STY (Grams Allyl Alcohol/Liter Hour)
[1] 103
[2] 958

EXAMPLE V

A solution of 34.1 grams $AgNO_3$ (0.20 mole) and 60.2 grams $Cd(NO_3)_2 \cdot 2H_2O$ (0.195 mole) in 200 milliliters of water was added simultaneously with a solution of 34.95 grams of 87.4% analytical reagent grade KOH (0.591 mole) in 200 milliliters of water to 400 milliliters of rapidly stirred distilled water. The pH of the supernatant phase after addition was 6.0. The volume of the suspension was increased to 1500 milliliters, and 1000 milliliters of Cab-O-Sil M-5 were added with vigorous stirring. The total volume was adjusted to 2000 milliliters and the slurry was filtered. The filter cake was washed with 3000 milliliters of distilled water, calcined in air at 250° C. for 21.5 hours, and the resulting catalyst precursor was crushed and screened to yield a 50–80 mesh fraction. Chemical analysis indicated that the composition contained 49.6% $SiO_2$, 25.9% Ag, 18.6% Cd, and 0.4% K. Powder X-ray diffraction indicated that metallic silver and cadmium oxide, CdO, both of medium order were present at this stage, besides the amorphous $SiO_2$ which did not contribute detectable X-ray diffraction lines.

A 7.35 grams quantity of this catalyst precursor were placed in a 0.925 cm i.d. by 28 cm reactor tube. Under 499 psig hydrogen flowing at 1500 SCCM, the reactor was heated to 200° C. from 18° C., maintained at 200° C. for 15 minutes, and cooled to 125° C. over a total period of one hour. The hydrogen was then replaced by 1 part acrolein in 111 parts hydrogen. Table V summarizes the results based on the analysis of liquid products collected at −78° C. under reactor pressure.

A 2.71 gram quantity of the catalyst precursor was placed in a 0.55 cm i.d. by 28 cm reactor tube, and under 620 psig hydrogen flowing at 1500 SCCM the material was heated from 10° C. to 200° C. over a period of one hour. The catalyst was maintained at 200° C. for 15 minutes and then cooled rapidly to 125° C., at which time an acrolein/hydrogen stream replaced the pure hydrogen. Table V summarizes various reactor conditions and the composition of the liquid products collected in a trap held at −78° C. and reactor pressure.

X-ray diffraction analysis of the used catalyst indicated that the principal AgCd alloy was the α-phase.

EXAMPLE VI

A 28.77 gram quantity of analytical reagent grade KOH (0.446 mole) was added to 200 milliliters of distilled water, and the resultant solution was warmed to 100° C. With rapid stirring a solution of 25.26 grams $AgNO_3$ (0.149 mole) and 45.85 grams $Cd(NO_3)_2 \cdot 4H_2O$ (0.149 mole) in 100 milliliters of distilled water was added. The suspension was cooled and diluted by the addition of 1000 milliliters of 2° C. distilled water followed by 100 milliliters of Cab-O-Sil M-5. Additional distilled water was added to adjust the total volume to 1800 milliliters. The pH of the supernatant phase was 6.5.

The suspension was vacuum filtered, and the filter cake was washed with 2000 milliliters of distilled water and calcined in air at 250° C. for 20 hours. The catalyst precursor was then crushed and screened to provide a 50–80 mesh fraction. X-ray diffraction examination revealed principally CdO of medium order, and no detectable silver lines.

A 4.04 gram quantity of this material was placed in a 0.55 cm i.d. by 28 cm reactor tube. The reactor under 490 psig hydrogen flowing at 1500 SCCM was heated from 20° C. to 200° C., held at 200° C. for 15 minutes and cooled to 125° C. over the course of 1.6 hours. At this time, the hydrogen was replaced by 1 part acrolein in 109 parts hydrogen. Table VI summarizes various reactor conditions, and the resultant composition of liquid products collected in a trap held at −78° C. and reactor pressure. The used catalyst, 5.7% silica and 65.7% alloys, consisted of well ordered α,γ and some ε-phase AgCd alloy on $SiO_2$. The average alloy composition was 52.4% Ag and 46.6% Cd.

TABLE VI

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 0.91 | 125 | 494 | 7.9 | 3.95 | 69.2 | 18.0 | 4.4 |
| 0.89 | 150 | 503 | 8.1 | 10.80 | 77.7 | 19.3 | 1.0 |
| 0.89 | 175 | 506 | 8.1 | 55.00 | 78.7 | 12.8 | 9.8 |
| 0.89 | 190 | 506 | 8.1 | 97.60 | 70.9 | 5.1 | 23.1 |
| 0.91 | 200 | 496 | 7.9 | 99.10 | 61.2 | 2.7 | 35.7 |

EXAMPLE VII

To a solution of silver and cadmium nitrates containing 102 grams $AgNO_3$ (0.600 mole) and 138.9 $Cd(NO_3)_2 \cdot 2H_2O$ (0.450 mole) in 150 milliliters of distilled water, a solution of 60.9 grams of 98.6% analytical reagent grade NaOH in 150 milliliters of distilled water was added with rapid stirring. The resultant black gel turned light brown on suspending in an additional 1500 milliliters of doubly distilled water. The precipitate was separated from the solution by vacuum filtration, washed with 2000 milliliters of doubly distilled water, and then ground in a mortar and pestle with 150 milliliters of DuPont Ludox AS Colloidal Silica. The mixture was dried for 20 hours at 95° C., and calcined in air at 200° C. for 60 hours. The mixture was then crushed and screened to yield a 50-80 mesh fraction. The composition contained 18.8% $SiO_2$, 27.2% Ag and 30.6% Cd.

A 13.10 gram quantity of this material was placed in a 0.925 cm i.d. by 28 cm reactor tube. Under 100 psig gas (99% He, 1% $H_2$) flowing at 200 SCCM, the temperature was raised in 12 minutes to 75° C., then at 25° C. per hour to 250° C. and maintained at the final temperature for 65 hours. The catalyst was cooled to 125° C., and the gas stream was changed to 510 psig hydrogen flowing at 1500 SCCM. After 24 minutes, the gas was changed to 1 part acrolein in 113 parts hydrogen. Table VII summarizes various reactor conditions and the resultant composition of the liquid products collected in a trap held at −78° C. and reactor pressure.

The used catalyst had a nitrogen BET surface area of 9.6 $m^2$/grams, and contained primarily γAgCd, with α and some ε AgCd alloy, all on silica. The average composition of the AgCd alloy was 54.9% Ag and 45.1% Cd.

reflux temperature for 6 hours. After cooling to room temperature, the silica was washed with distilled water several times and then placed in a Soxhlet Extractor with distilled water and calcium oxide in the water-boiling flask. The silica was then extracted for 24 hours, after which time the extraction liquid was neutral. The silica was dried by flowing oxygen gas at one atmosphere over the material at 525°-535° C. for six hours. The dried material was transferred to a flask, and admixed with a solution containing 0.72 mole $AgNO_3$ and 0.35 mole of $Cd(NO_3)_2$ in 200 milliliters of water.

The material was recovered and placed in a glass tube on a vacuum system, and initial drying was accomplished at 100 Torr by connecting the tube to a liquid nitrogen cooled trap. The tube was heated to 300° C. and the pressure was reduced to $10^{-4}$ Torr for 30 minutes, then 5 psig hydrogen gas was introduced. Brown nitrogen oxide fumes resulted and the pressure was again reduced to $10^{-4}$ Torr for 15 minutes. This cycle was repeated until no brown fumes were noticeable. The pressure was reduced to $10^{-4}$ Torr for 15 minutes and then 1 atm hydrogen was introduced. The catalyst was allowed to cool under hydrogen to room temperature, at which time the hydrogen was replaced with nitrogen and the catalyst was removed. Powder X-ray diffraction analysis indicated that α-phase AgCd alloy was present on the silica.

A 7.85 gram quantity of the catalyst was placed in a 0.925 cm i.d. by 28 cm reactor tube. The catalyst, under 509 psig hydrogen flowing at 200 SCCM, was rapidly heated to 250° C. and maintained under those conditions for 21.4 hours. The temperature was gradually reduced to 125° C., and then the hydrogen was replaced by 1 part acrolein in 100 parts of hydrogen.

Table VIII summarizes various reactor conditions and the resultant composition of the liquid products

TABLE VII

| Mole Percent Acrolein In Feed | Catalyst Temp. °C | Reactor Pressure psig | Contact Time sec. | Weight Percent Acrolein Conversion | Weight percent Product Selectivity | | |
|---|---|---|---|---|---|---|---|
| | | | | | Allyl Alcohol | Propanal | Propanol |
| 0.87 | 125 | 515 | 20.0 | 19.1 | 77.0(1) | 12.5 | 1.6 |
| 0.87 | 150 | 515 | 20.0 | 69.7 | 79.7(2) | 10.0 | 4.1 |
| 0.88 | 175 | 510 | 19.9 | 99.2 | 68.5(3) | 0.8 | 27.3 |

STY (Grams Allyl Alcohol/Liter Hour)
(1) 13.3
(2) 47.0
(3) 84.9

EXAMPLE VIII

One hundred milliliters of 30 mesh Girdler Silica T-1571 was cautiously added to one liter of 9 parts concentrated nitric acid and 1 part concentrated perchloric acid. The mixture was heated and maintained at collected by a trap held at −78° C. at reactor pressure.

The used catalyst was analyzed as containing 69.7% $SiO_2$, 3.7% Cd and 7.2% Ag, and had a nitrogen BET surface area of 53.6 $m^2$/g. The 66.1% silver, 33.9% cadmium α-phase alloy on the silica exhibited a X-ray diffraction pattern of moderate order.

TABLE VIII

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 0.90 | 125 | 498 | 16.7 | 5.4 | 71.7 | 21.50 | 1.30 |
| 0.90 | 150 | 500 | 16.8 | 17.7 | 73.1 | 16.70 | 1.50 |
| 0.91 | 175 | 496 | 16.7 | 71.3 | 69.6 | 20.20 | 6.40 |
| 0.92 | 200 | 490 | 16.5 | 99.8 | 65.0 | 1.15 | 30.75 |

EXAMPLE IX

This Example illustrates the low conversions and low yields obtained when a silver-cadmium catalyst not in accordance with the present invention contains unalloyed silver crystallites.

A solution of 34 grams $AgNO_3$ (0.200 mole) and 30 grams $Cd(NO_3)_2 \cdot 4H_2O$ (0.097 mole) in 100 milliliters of distilled water was added with rapid stirring to 15.6 grams $NH_4HCO_3$ (0.197 mole) in 150 milliliters of distilled water. Carbon dioxide evolved and a yellow precipitate formed. With vigorous stirring to keep the precipitate in suspension, 200 milliliters of Cab-O-Sil M-5 was added and the resultant suspension stirred gently for 2 hours and allowed to settle overnight. The solids were filtered and washed with 500 milliliters of 4° C. distilled water. The filter cake was dried and crushed and screened to yield a 50–80 mesh fraction. Bulk chemical analysis and powder X-ray diffraction analysis indicated that the catalyst precursor consisted of 48.9% Ag as Ag crystallites, 28.0% Cd as CdO, and 20.4% $SiO_2$ by weight.

A 2.97 gram quantity of the 50–80 mesh fraction was placed in a 0.925 cm i.d. by 28 cm reactor tube, and 203 psig hydrogen flowing at 750 SCCM was passed over the catalyst as the temperature was increased from 24° C. to 125° C. over a period of 24 minutes. One part acrolein in 40 parts hydrogen was then substituted for the pure hydrogen gas. Table IX summarizes the results obtained by gas chromatographic analysis of the reactor effluent stream.

The used catalyst, which analyzed as 30.9 Ag, 17.4% Cd and 29.7% $SiO_2$ (64% Ag and 36% Cd on a metal basis), was found by X-ray diffraction studies to have an AgCd phase containing α-AgCd and γ-AgCd, and large pure Ag crystallites which indicated that a significant portion of the silver was not alloyed. The X-ray diffraction lines were at 2.40, 2.36, 2.04, 1.46-7, 1.44, 1.25, and 1.23. The Ag lines and back reflection indicated the presence of large Ag crystals. The AgCd associated lines and back reflection were sharp.

EXAMPLE X

This Example illustrates the low conversions and low yields obtained when a silver-cadmium catalyst not in accordance with the present invention contains a minor quantity of silver metal and consists substantially of cadmium metal on a carrier substrate.

Two solutions were prepared by dissolving 1.01 grams $AgNO_3$ (0.006 mole) and 89.91 grams $Cd(NO_3)_2 \cdot 4H_2O$ (0.291 mole) in 100 milliliters of distilled water, and dissolving 37.81 grams 87.4% reagent grade KOH (0.589 mole) in 100 milliliters of distilled water. Both solutions were added rapidly and simultaneously to 200 milliliters of vigorously stirred distilled water. The pH of the liquid medium was about 6.5. About 500 milliliters of Cab-O-Sil M-5 were added along with sufficient water to keep the medium fluid. The volume was adjusted to 1800 milliliters with additional distilled water.

A filter cake was recovered by vacuum filtration, washed with 2000 milliliters of distilled water, and then calcined in air at 250° C. for 17.5 hours. The reddish tan catalyst precursor was cooled to room temperature in a vacuum desiccator prior to being crushed and screened to provide a 50–80 mesh fraction. Chemical analysis indicated that the composition contained 32% $SiO_2$, 51% Cd, and 1% Ag. CdO of medium order was the Cd species found by X-ray diffraction.

A 8.15 gram quantity of this material were placed in a 0.925 cm i.d., by 28 cm reactor tube. The material was heated under 499 psig hydrogen flowing at 1400 SCCM from 18° C. to 200° C., maintained at 200° C. for 15 minutes, and cooled to 125° C. over a total period of 1.6 hours. 1 part acrolein in 40 parts hydrogen was intorduced 12 minutes later.

Table X summarizes various reactor conditions and the resultant composition of the liquid products collected in a trap at −78° C. and reactor pressure.

The used catalyst, by X-ray diffraction, appeared to have well ordered cadmium rich η-phase AgCd with a structure not differing significantly from metallic Cd. The average composition of this alloy was 2% silver and 98% cadmium by chemical analysis. The used catalyst had a nitrogen BET surface area of 71.4 $m^2$/gram.

TABLE IX

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 2.2 | 125 | 201 | 8.1 | 20.3 | 27.5 | 67.1 | 5.4 |
| 2.2 | 150 | 203 | 8.2 | 27.7 | 34.1 | 62.1 | 3.8 |
| 2.2 | 175 | 206 | 8.3 | 23.4 | 32.8 | 62.8 | 4.3 |
| 0.9 | 175 | 494 | 10.7 | 49.5 | 0.0 | 87.8 | 12.2 |

TABLE X

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanol | Propanol |
| 0.90 | 125 | 499 | 21.0 | 3 | 12 | 5 | 54 |
| 0.88 | 150 | 511 | 21.5 | 2 | 4 | 5 | 55 |
| 0.92 | 190 | 490 | 20.6 | 16 | 28 | 4 | 3 |
| 0.92 | 225 | 491 | 20.7 | 33 | 33 | 7 | 2 |
| 0.90 | 250 | 498 | 20.8 | 56 | 27 | 13 | 1 |

EXAMPLE XI

This Example illustrates the low yields obtained when a silver-cadmium catalyst not in accordance with the present invention contains a minor quantity of cadmium metal and consists substantially of silver metal on a carrier substrate.

To a solution of silver and cadmium nitrates prepared by adding 102 grams $AgNO_3$ (0.600 mole) and 90 grams $Cd(NO_3)_2.4H_2O$ (0.292 mole) to 120 milliliters of distilled water, 120 milliliters of 1 normal sodium hydroxide solution was added with rapid stirring. The resultant precipitate was separated from the solution by vacuum filtration, washed with 600 milliliters of distilled water, and resuspended in 90 milliliters of DuPont Ludox AS Colloidal Silica with rapid stirring. The suspension was air dried at 100° C. for 17 hours, and calcined at 250° C. for 20 hours in air. The catalyst precursor was cooled in a vacuum desiccator, and then crushed and screened to yield a 50-80 mesh fraction. By chemical analysis it was determined that the composition contained 45.4% silica, 27.9% silver, 1% cadmium and 2.8% sodium. Well ordered crystals of CdO, $Cd(OH)_2$ and Ag were present.

A 3.96 gram quantity of this material was placed in a 0.55 cm i.d. by 28 cm reactor tube. Under 494 psig hydrogen flowing at 1300 SCCM the reactor was rapidly heated from 18° C. to 250° C., held at 250° C. for 30 minutes, and then cooled to 125° C. After an additional six minutes, 1 part acrolein in 110 parts hydrogen was introduced. Table XI summarizes reactor conditions and the resultant composition of the products collected in a trap held at −78° C. and reactor pressure. The used catalyst had a nitrogen surface area of 81.5 $m^2$/gram, and powder X-ray diffraction examination identified well ordered silver crystals on silica. The used catalyst had a 96.5% silver and 3.5% cadmium metal alloy content.

EXAMPLE XII

This Example illustrates the lower conversions obtained when a silver-cadmium catalyst not in accordance with the present invention contains coprecipitated silver-cadmium alloy without a carrier substrate.

Two solutions were prepared by dissolving 34.0 grams $AgNO_3$ (0.200 mole) and 41.2 grams $Cd(NO_3)_2.4H_2O$ (0.134 mole) in 100 milliliters of distilled water, and 30.12 grams of 87.0% analytical reagent grade KOH (0.537 mole) in 100 milliliters of distilled water. Both solutions were added simultaneously and in a rapid dropwise fashion to 400 milliliters of vigorously stirred distilled water. The pH was adjusted to 7.0 with KOH or $KNO_3$ as needed, and the volume was increased with distilled water to 2000 milliliters. The suspension was allowed to settle at 4° C., protected from light. The clear supernatant liquid was drawn off and fresh distilled water was added to adjust the volume to 2000 milliliters.

The solids were recovered from the solution by vacuum filtration, washed with 2000 milliliters of distilled water, and calcined in air at 200° C. for 20 hours. After cooling in a vacuum desiccator, the material was crushed and sieved to yield a 50-80 mesh fraction. Chemical analysis indicated that the bulk material was 55.6% Ag and 43.4% Cd.

A 6.83 gram quantity of this material was placed in a 0.55 cm i.d. by 28 cm reactor tube. Over a period of two hours, the catalyst was treated with 501 psig hydrogen flowing at 1500 SCCM heated from 24° to 250° C., held at 250° C. for 15 minutes, and cooled to 125° C. At this time, 1 part acrolein in 111 parts hydrogen replaced the pure hydrogen flow stream.

Table XII summarizes various reactor conditions and the resultant composition of the liquid products collected in a trap held at −78° C. and reactor pressure. The used catalyst had a nitrogen BET surface area of 0.15 $m^2$/gram, and was a mixture of $\alpha, \gamma$ with some $\epsilon$-phase silver-cadmium alloys.

TABLE XI

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanol | Propanol |
| 0.92 | 75 | 489 | 5.5 | 19.2 | 45.9 | 51.8 | 1.0 |
| 0.92 | 100 | 490 | 5.5 | 46.7 | 49.9 | 47.6 | 1.0 |
| 0.91 | 125 | 495 | 5.5 | 99.4 | 44.4 | 32.1 | 23.1 |

TABLE XII

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanol | Propanol |
| 0.89 | 125 | 503 | 5.6 | 1.4 | 33.9 | 47.4 | 0.0 |
| 0.88 | 150 | 508 | 5.6 | 1.5 | 30.3 | 53.9 | 0.0 |
| 0.86 | 175 | 523 | 5.9 | 7.0 | 73.2 | 25.2 | 0.6 |
| 0.86 | 185 | 522 | 5.9 | 17.7 | 74.5 | 19.5 | 1.5 |

TABLE XII-continued

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanol | Propanol |
| 0.86 | 200 | 524 | 5.9 | 27.3 | 69.8 | 22.5 | 2.6 |

EXAMPLE XIII

This Example illustrates the conversions and yields obtained when a silver-cadmium alloy catalyst contains copper metal.

Two solutions were prepared by dissolving 34.00 grams $AgNO_3$ (0.20015 mole), 30.00 grams $Cd(NO_3)_2 \cdot 4H_2O$ (0.09725 mole), and 0.60 gram $Cu(NO_3)_2 \cdot 3H_2O$ (0.00248 mole) in 100 milliliters of distilled water, and 25.70 grams of 87.4% analytical reagent grade KOH (0.4003 mole) in 100 milliliters of distilled water. Both solutions were added rapidly and simultaneously to 100 milliliters of vigorously stirred distilled water. After the formation of the blackish gelatinous precipitate, the volume of the system was adjusted to 1000 milliliters with additional distilled water. The pH of the supernatant was 6.5. 1000 milliliters of Cab-O-Sil M-5 and sufficient water to adjust the total volume to 1800 milliliters were added. The precipitate was removed from the supernatant solution by vacuum filtration and washed with 2000 milliliters of distilled water. The solid was then calcined in air at 250° C. for 20 hours. The material was crushed and sieved to yield a 50–80 mesh fraction. The composition analyzed as containing 53.7% $SiO_2$, 26.9% Ag 16.9% Cd, 0.5% K, and 0.8% Cu. Powder X-ray diffraction examination identified only lines indicating CdO.

A 7.72 grams quantity of this material was placed in a 0.925 cm i.d. by 29 cm reactor tube. With 500 psig hydrogen flowing over the catalyst precursor at 1500 SCCM, the temperature of the reactor was increased from 19° C. to 200° C., held at 200° C. for 15 minutes, and cooled to 125° C. The hydrogen stream was replaced with 1 part acrolein in 110 parts hydrogen.

Table XIII summarizes various reactor conditions and the resultant composition of liquid products collected in a trap held at −78° C. and reactor pressure. The used catalyst had a surface area of 47.8 m²/gm, and exhibited a silver rich α-phase AgCd(Cu) alloy on silica with an average composition of 60.31% Ag, 37.89% Cd and 1.79% Cu.

In the same manner, a second catalyst was prepared with a bulk content of 54.4% $SiO_2$, 31.6% Ag, 14.1% Cd, and about 660 ppm Cu.

Table XIII-A summarizes various reactor conditions and the resultant composition of the liquid products collected in a trap held at −78° C. and reactor pressure employing the second catalyst.

The used catalyst, on powder X-ray diffraction examination, exhibited sharp lines at 2.36, 2.04, 1.44, 1.23 Å, with a strong sharp back reflection pattern evident. Chemical analysis indicated a silver rich α-phase AgCd(Cu) alloy of 69.0% Ag, 30.8% Cd, and 0.14% Cu average composition on the silica.

TABLE XIII

| Mole Percent Acrolein In Feed | Catalyst Temp °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 0.89 | 125 | 507 | 14.2 | 44.3 | 68.1 | 23.9 | 2.8 |
| 0.89 | 150 | 508 | 14.2 | 90.9 | 66.3 | 23.9 | 9.4 |
| 0.89 | 175 | 510 | 14.3 | 99.6 | 57.7 | 6.7 | 35.5 |

TABLE XIII-A

| 0.88 | 125 | 510 | 9.0 | 18.0 | 82.6 | 15.2 | 2.2 |
| 0.88 | 150 | 510 | 9.0 | 30.3 | 74.8 | 15.6 | 1.4 |
| 0.88 | 175 | 510 | 9.0 | 63.8 | 77.2 | 19.4 | 3.4 |

EXAMPLE XIV

This Example illustrates the superior selective hydrogenation properties of a silver-cadmium catalyst which is calcined at a temperature below 300° C., in comparison with a silver-cadmium catalyst which is calcined at a temperature above 300° C.

A solution was prepared by dissolving 101.92 grams $AgNO_3$ (0.6 mole) and 64.78 grams $Cd(NO_3)_2 \cdot 4H_2O$ (0.21 mole) in 250 milliliters of distilled water. A second solution was prepared by dissolving 66.47 grams 86.1% reagent grade KOH (1.02 moles) in 100 milliliters of distilled water. Both solutions were added rapidly and simultaneously to 250 milliliters of distilled water about 500 milliliters of Cab-O-Sil M-5 silica were added, and the volume of the suspension was adjusted to 1800 milliliters with distilled water. A filter cake was recovered by vacuum distillation and washed with 6000 milliliters of distilled water.

One portion of the filter cake was heated from room temperature to 175° C. over a period of 4 hours, and then calcined at 175° C. for 20 hours.

The other portion of the filter cake was warmed from room temperature to 175° C. over a period of 4 hours, and then heated to 400° C. over a period of 2 hours. The catalyst precursor was then calcined at 400° C. for 2 hours.

Each of the two catalyst precursor compositions was crushed and sieved to 50–80 mesh granules.

Chemical analysis indicated that the 175° C. calcination catalyst contained 15% $SiO_2$, 49% Ag and 17% Cd. Powder X-ray diffraction examination disclosed $Ag_2O$, CdO, $Cd(OH)_2$ with a small amount of Ag. The crystallinity was low with no back reflection.

Chemical analysis indicated that the 400° C. calcination catalyst precursor contained 15% $SiO_2$, 54% Ag and 19% Cd. Powder X-ray diffraction examination disclosed $Ag_2O$, CdO and Ag. The crystallinity was medium with a broad back reflection.

A 3.29 gram quantity of the 175° C. calcination catalyst precursor granules was placed in a reactor tube under 500 psig hydrogen flowing at 480 SCCM and heated to 175° C. over a period of 5 hours, and after fifteen minutes cooled to room temperature. Chemical analysis indicated that the catalyst reduced in this manner contained 15% $SiO_2$, 56% Ag and 19% Cd. Powder X-ray diffraction examination disclosed principally α-phase AgCd of low crystallinity with a broad very diffuse back reflection.

Employing the same procedure, a 3.29 gram quantity of 400° C. calcination catalyst precursor was reduced under hydrogen. Chemical analysis indicated that this catalyst contained 17% $SiO_2$, 62% Ag and 22% Cd. Powder X-ray diffraction disclosed substantially unalloyed Ag and what appeared to be $Cd_8Ag_5$, both of medium crystallinity with broad back reflection.

Acrolein Conversion To Allyl Alcohol

A 6.87 gram quantity of the 175° C. calcination catalyst precursor was reduced with hydrogen in the manner described above. The hydrogen flow was then increased to 1000 SCCM at a catalyst temperature of 127° C., and then the gas stream was changed to 0.9 mole percent acrolein and 99.1 mole percent hydrogen. The following TABLE XIV summarizes reactor condition and the resultant composition of the liquid products collected in a trap held at −78° C. and reactor pressure.

The used catalyst was analyzed as containing 15% $SiO_2$, 52% Ag and 18% Cd. Powder X-ray diffraction examination indicated principally α-phase silver cadmium alloy with a broad back reflection. The crystallinity was low to medium.

A 6.87 gram quantity of the 400° C. calcination catalyst precursor was reduced with hydrogen in the manner described above, and the reduced catalyst was employed for acrolein conversion to allyl alcohol. TABLE XIV-A summarizes reaction conditions and the resultant composition of the liquid products.

The used catalyst was analyzed as containing 17% $SiO_2$, 53% Ag and 18% Cd. Powder X-ray diffraction examination indicated substantially unalloyed Ag and what appeared to be $Cd_8Ag_5$, both of medium crystallinity with a broad back reflection.

TABLE XIV

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 0.9 | 127 | 505 | 20.2 | 92.2 | 80.0 | 3.3 | 16.7 |
| 0.9 | 148 | 505 | 20.2 | 99.0 | 75.8 | 7.3 | 16.9 |

TABLE XIV-A

| 0.9 | 148 | 500 | 20.0 | 98.8 | 64.9 | 0.4 | 34.8 |
| 0.9 | 152 | 500 | 20.0 | 99.8 | 59.9 | 0.5 | 39.6 |

What is claimed is:

1. A catalyst composition consisting essentially of a silver-cadmium alloy on a carrier substrate, wherein the atomic ratio of silver to cadmium in the alloy is in the range of between about 0.1 and 4 to 1 and the silver-cadmium alloy exhibits an X-ray diffraction pattern which is substantially free of detectable unalloyed metal crystallite lines.

2. A catalyst composition in accordance with claim 1 wherein the atomic ratio of silver to cadmium in the alloy is in the range of between about 0.4 and 3 to 1.

3. A catalyst composition in accordance with claim 1 wherein the quantity of carrier substrate in the catalyst is in the range between about 5 and 99.5 weight percent, based on the total catalyst weight.

4. A catalyst composition in accordance with claim 1 wherein the carrier substrate is alumina.

5. A catalyst composition in accordance with claim 1 wherein the carrier substrate is silica.

6. A catalyst composition in accordance with claim 1 wherein the silver-cadmium alloy consists of more than about 50 percent γ-phase silver-cadmium crystallites.

7. A catalyst composition in accordance with claim 1 wherein the silver-cadmium alloy consists substantially of α-phase silver-cadmium alloy crystallites, and the X-ray diffraction pattern of the α-phase silver-cadmium alloy does not exhibit line splitting.

8. A catalyst composition in accordance with claim 1 wherein the silver-cadmium alloy consists essentially of α-phase, γ-phase and ε-phase silver-cadmium alloy crystallites, and the X-ray diffraction pattern of the α-phase silver-cadmium alloy does not exhibit line splitting.

9. A catalyst composition in accordance with claim 1 wherein the silver-cadmium alloy consists essentially of α-phase and γ-phase silver-cadmium alloy crystallites, and the X-ray diffraction pattern of the α-phase does not exhibit line splitting.

* * * * *